May 6, 1941.　　　L. W. GILLESPIE　　　2,240,843
AUTOMATIC HEADLIGHT CONTROL
Filed Nov. 10, 1938　　　2 Sheets-Sheet 1
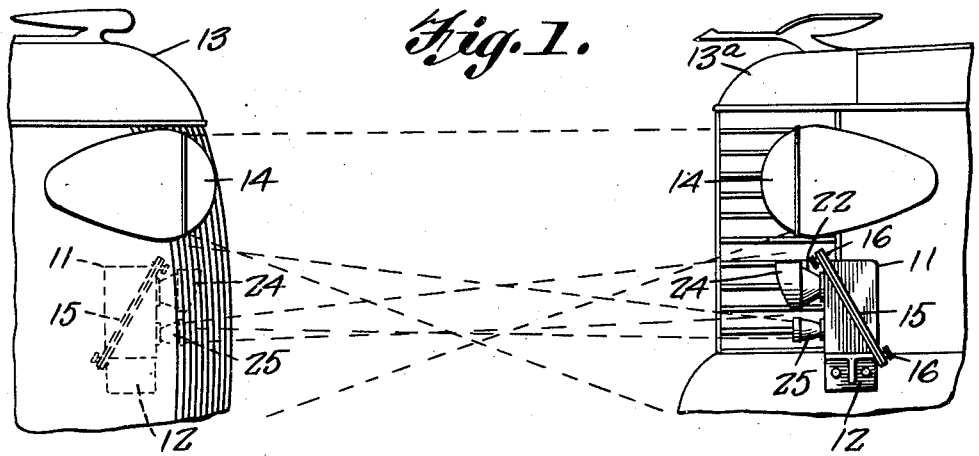
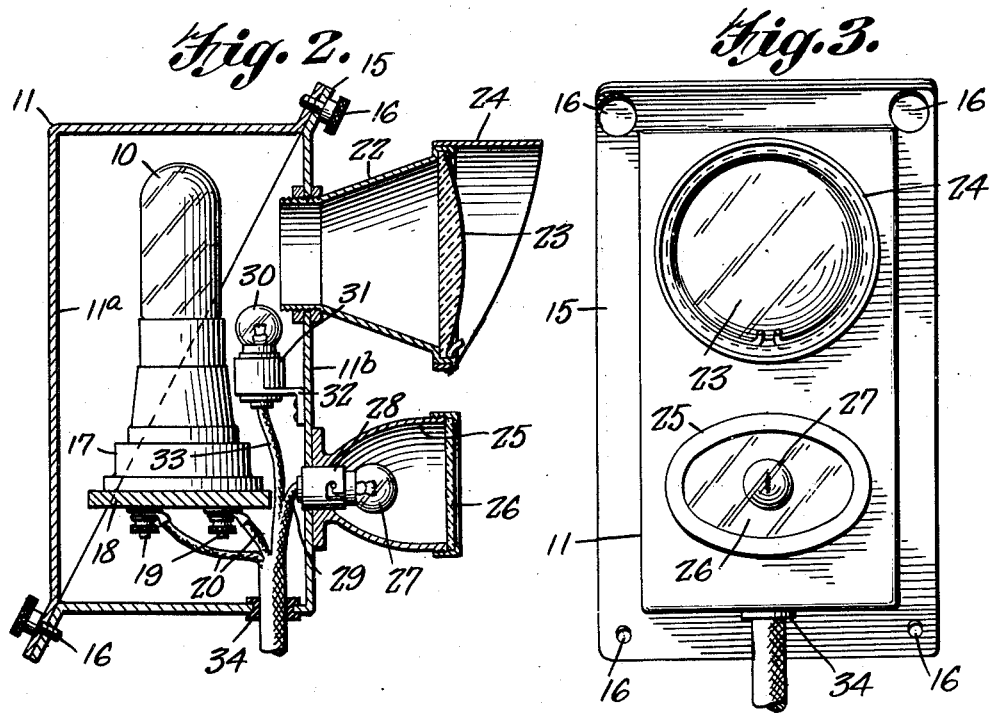
Inventor
Leonard W. Gillespie, Deceased,
By, John H. Parker, Administrator.
BY *Victor J. Evans & Co.*
ATTORNEYS

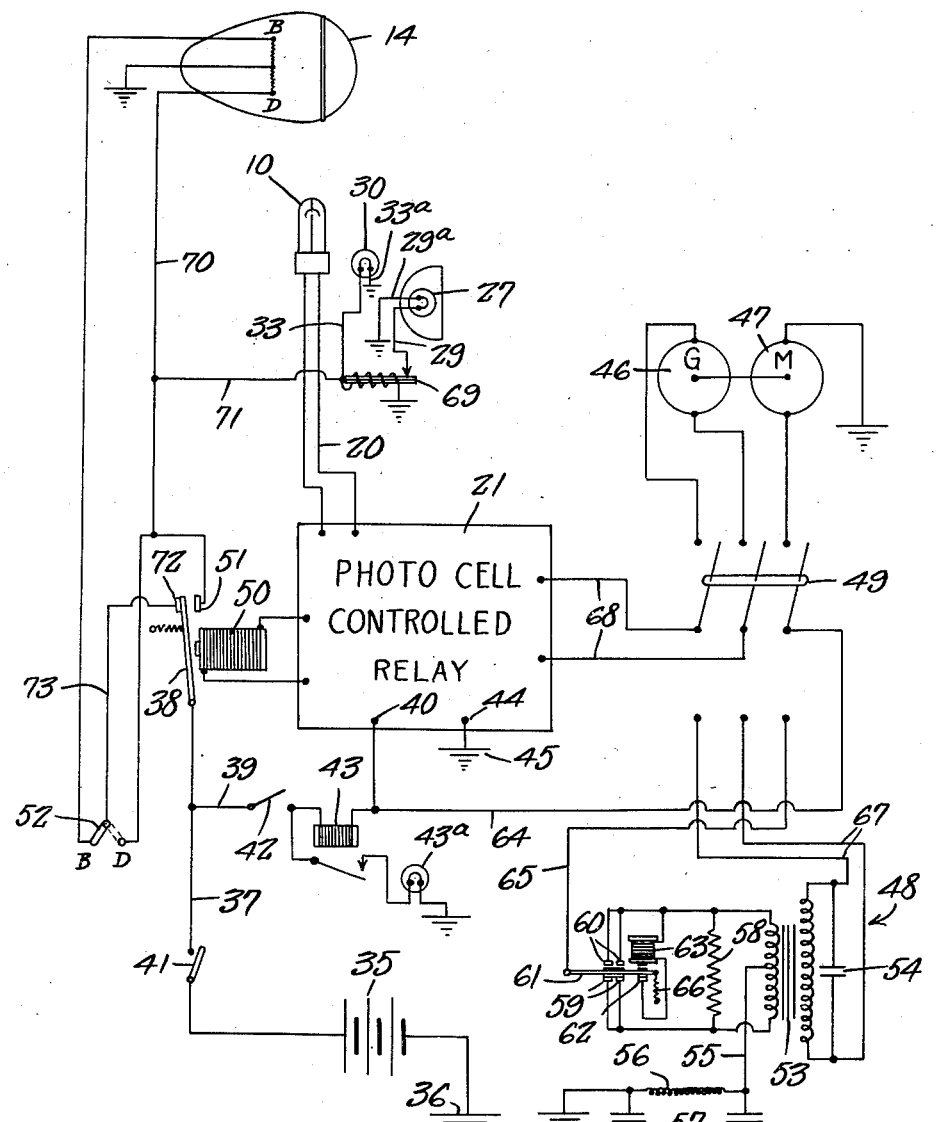

Patented May 6, 1941

2,240,843

UNITED STATES PATENT OFFICE 2,240,843

AUTOMATIC HEADLIGHT CONTROL

Leonard W. Gillespie, Greensburg, Ind.

Application November 10, 1938, Serial No. 239,896

4 Claims. (Cl. 171—97)

The object of the invention is to provide means for application to motor vehicles to function in connection with the headlights thereof, so that when two vehicles are approaching each other, if the bright headlights are functioning, they will be automatically extinguished and the dim headlights automatically lighted; to provide a construction of the kind indicated wherein the dimmed position of the headlights will be maintained until the vehicles have passed but the bright position of the headlights subsequently reestablished; and to provide an automatic headlight control which is of comparatively simple form and susceptible of cheap manufacture and installation on conventional motor vehicles without modification thereof.

With this object in view, the invention consists in a construction and combination of parts of which a preferred embodiment is illustrated in the accompanying drawings but to which the invention is not to be restricted. Practical application may dictate certain changes or alterations and the right is claimed to make any which fall within the spirit of the invention.

In the drawings:

Figure 1 is an elevational view showing the forward ends of approaching automobiles with the invention applied in operative position.

Figure 2 is a vertical sectional view through the control light casing.

Figure 3 is a front elevational view of the structure of Figure 2.

Figure 4 is a diagrammatic view.

The invention comprises a light sensitive cell 10 which is affected by the headlight of an approaching vehicle, or by an auxiliary light, and controls means by which the headlight of the associated vehicle, if in the bright position, will be shifted over to the dim position. The light sensitive cell 10 is mounted in a casing 11 carried on an appropriate bracket 12 which is attached to the vehicle 13 directly below the headlight 14. The casing 11 is in the form, preferably, of a rectangular parallelopiped and is split on a diagonal line to provide the sections 11a and 11b, each of which is flanged, as indicated at 15, the sections of the casing being secured together by hand screws 16 passing through body holes in the flange of one section and engaging threaded holes in the flange of the other.

The light sensitive cell 10 is mounted in an appropriate socket 17 carried on an insulating shelf 18 appropriately supported in the casing section 11b. The socket terminals 19 are on the underside of the shelf and the conductors 20 which lead to the relay 21 are connected with them.

Mounted in the front wall of the casing 11 is a flaring lens tube 22 at the outer end of which is carried a converging lens 23 and a visor 24.

Directly below the lens tube but mounted on the front wall of the casing 11 is the auxiliary energizing light casing 25 provided with a lens 26. Within the lens casing is the light 27 which is carried in the socket 28, the light being fed through the conductors 29, of which one, as indicated at 29a, is grounded, preferably to the case, if the ground be not made within the socket itself. The casing 25 and its lens 26 are of oval shape with the major axis of the oval disposed horizontally.

Mounted within the casing 11 is the supplemental light 30 which is carried in the socket 31 supported on a bracket 32 on the inner face of the front wall of the casing 11, conductors 33 feeding the light 30 but one, as at 33a, being grounded. The conductors 33, 29 and 20 are preferably incorporated in one cable which is led to the relay 21, the relay being preferably mounted interior to the vehicle. The bottom wall of the casing 11 is bushed, as indicated at 34, where the cable passes through the wall of the casing, the bushing being preferably an insulating bushing.

The relay indicated at 21 is the conventional photo cell controlled relay consisting of one or more triodes of which the grid circuit of the first, say, is connected with the light sensitive cell 10, one of the conductors 20 being connected with the grid and the other with the cathode of the tube.

The filament circuits of the tubes are energized from the car battery 35, grounded, as in the conventional practice, at 36, with the positive pole connected by means of a conductor 37 with the armature 38 and with the relay 21, by means of a conductor 39 at the binding post 40. A main line switch 41 is interposed in the conductor 37 and a similar switch 42 in the conductor 39. A relay 43 controlling a telltale lamp 43a is also connected serially in the conductor 39. The relay 21 is grounded at the binding post 44, as indicated at 45.

Plate current for the relay is obtained either from the generator end 46 of the motor generator set 46—47, or from an alternating current generating device 48 energized from the battery 35, the triple-pole double-throw switch 49 connecting in the motor generator set or the generating device 48.

The armature 38 is responsive to energization of the magnet 50 which is connected to the relay 21 and is preferably thrown across the battery by a relay in the plate circuit of the triode in the relay 21. It is normally spring impelled away from the contact 51 but engages the latter contact when the magnet 50 is energized. If desired means may be provided for locking it in its retracted position.

The headlight shown is of the dual filament form and either the bright or the dim filament is connected in circuit by the appropriate setting of the manual switch 52.

The alternating current generating device 48 comprises a transformer 53 across whose secondary is connected a condenser 54 but whose primary is center-tapped and grounded through a conductor 55 in which is interposed a resistor 56 by-passed on either side by condensers 57 connected with the ground. A resistor 58 preferably bridges the entire primary. The extremities of the primary are connected with contacts 59 and 60 respectively between which vibrates an armature 61, the armature being spring impelled toward a contact 62 in series with a magnet 63 which is connected with one extremity of the primary.

When the switch 49 is in the position to connect the generating device 48 in circuit, current flows from the battery 35 over the conductors 37 and 39 (the switches 41 and 42 being closed), through the relay 43, the conductor 64, to the hinge clip of one of the blades of the switch 49, thence over the connected switch blade to the forked clip of the switch, thence over the conductor 65 to the armature 61 which is in engagement with the contacts 58 and 62 by reason of the pull of the spring 66. From the contact 62, current flows through one side of the primary of the transformer and thence over the conductor 55 to the ground. A second increment of the current flows through the opposite side of the primary of the transformer and thence over the conductor 55 to the ground. But current passing from the contact 52 passes through the magnet 63, so that the armature 61 is raised and disengaged from the contacts 58 and 62 but engaged with the contacts 60, when battery current will flow from the armature over the contact 60 and through one side of the transformer primary and to the ground, returning to the battery through the ground connection in all cases. The continual making and breaking of the primary circuit results in the well known changing magnetic field which reacts on the secondary of the transformer. The extremities of the secondary are connected by means of the conductors 67 with the two remaining forked clips on the one side of the double-throw triple-pole switch 49 so that plate current will flow over the switch blades through the conductors 68 to the plate circuits of the triodes in the relay 21.

When the motor generator set is employed for plate energization in the relay 21, the switch 49 is thrown to connect that in circuit, when battery current will flow over the conductor 64 and through the motor 47 and back to the battery over the ground connections. The generator output will then flow over the conductors 68 to the plate circuits of the triodes.

A thermostat 69 is employed to control the circuit on the lamp 27 and functions when the dim filament of the headlight 14 is energized.

In operation, let it be assumed that two cars, as shown in Figure 1, equipped with the invention, are approaching each other and let it be assumed that the first effect is the result of the rays of the headlight of the car 13a. These will pass through the condensing lens 23 and energize the cell 10 whose resistance, being thus lowered, affects the grids in the triodes in the relay 21, so that current will flow in the plate circuits of the triodes and effect energization of the relay which controls the circuit of the magnet 50, so that the circuit of such magnet is closed. The armature 38 will then be drawn into engagement with the contact 51 and battery current will flow over the conductor 37, the armature 38, the contact 51, the conductor 70, the filament D and then through the ground back to the battery, it being assumed that the switch 52 was in the position to place the B filament in circuit. But an increment of the current that flows over the conductor 37 will also flow over the conductor 71, through the winding of the thermostat 69 to the ground and thence back to the battery. Likewise an increment will flow over one of the conductors 33, through the lamp 30 and back to the battery through the ground connection.

The light 30 is provided to give the additional luminosity necessary to keep the cell 10 active if the headlight on the car 13a has been dimmed, the dim filament of the car 13a together with the light 27 thereof providing jointly with the lamp 30 of the car 13 a sufficient luminosity to keep the cell 10 active. As long as the light sensitive cell is active, the magnet 50 will be energized and the armature engaged with the contact 51.

But the current flowing through the winding of the thermostat 69 will, after an interval, be sufficient to flex the thermostat, so that it will open the circuit on the light 27. The light will thus be put out as will the corresponding light on the car 13a by the functioning of its thermostat. This will leave only the lights 30 as the activating means for the cell 10 which will be insufficient to maintain any grid condition of the triodes in the relay 21 that will permit of any material plate current flowing.

If, for example, the headlight 14 of the car 13 is dimmed by the light on the car 13a affecting the cell 10 on the car 13, the series of operations described above will take place on the car 13. But then there are no bright headlight rays to affect the cell 10 on the car 13a. On the automatic switching to the D filament of the car 13, however, the light 27 of the car 13 is placed in circuit and energizes the light sensitive cell 10 in the car 13a. The lights 27 only function in the switch-over to the D filament in the headlight.

When the magnet 50 is not energized, the armature is engaged with a contact 72 which is connected by means of a conductor 73 with the blade of the switch 52 which is of the single-pole double-throw variety. When the automatic device is not functioning, the bright and dim filaments may be selectively used by the appropriate setting of the switch 52.

By making the lens 26 of oval shape and disposing it with the major axis horizontally, the beam from the auxiliary light casing 25 is given a fan shape, more or less, causing it to sweep the road and therefore affect the light sensitive cell in the approaching car.

The invention having been described, what is claimed as new and useful is:

1. An automatic headlight control for motor vehicles comprising, in combination with a vehicle headlight having bright and dim filaments, a switch normally in the position to excite the bright filament but shiftable to deenergize the latter and excite the dim filament, automatic means controlling said switch, a light sensitive cell controlling said automatic means and positioned for energization by the headlight of an approaching vehicle, a supplemental light positioned adjacent said cell and energized in the dim position of said switch, and an auxiliary energizing light energized when the switch is in a dimmed position and so positioned to affect the cell of an approaching car on which the corresponding auxiliary energizing light jointly with the supplemental light maintains the activity of said cell.

2. An automatic headlight control for motor vehicles comprising, in combination with a vehicle headlight having bright and dim filaments, a switch normally in the position to excite the bright filament but shiftable to deenergize the latter and excite the dim filament, automatic means controlling said switch, a light sensitive cell controlling said automatic means and positioned for energization by the headlight of an approaching vehicle, a supplemental light positioned adjacent said cell and energized in the dim position of said switch, and an auxiliary energizing light energized when the switch is in a dimmed position and so positioned to affect the cell of an approaching car on which the corresponding auxiliary energizing light jointly with the supplemental light maintains the activity of said cell, the said auxiliary energizing light being provided with an automatic delayed cutout.

3. An automatic headlight control for motor vehicles comprising, in combination with a vehicle headlight having bright and dim filaments, a switch normally in the position to excite the bright filament but shiftable to deenergize the latter and excite the dim filament, automatic means controlling said switch, a light sensitive cell controlling said automatic means and positioned for energization by the headlight of an approaching vehicle, a supplemental light positioned adjacent said cell and energized in the dim position of said switch, and an auxiliary energizing light energized when the switch is in a dimmed position and so positioned to affect the cell of an approaching car on which the corresponding auxiliary energizing light jointly with the supplemental light maintains the activity of said cell, the cell and supplemental light being housed in a casing positioned below said headlight and the casing having a condensing means carried in the front wall thereof to concentrate the light rays from an approaching vehicle on said cell.

4. An automatic headlight control for motor vehicles comprising, in combination with a vehicle headlight having bright and dim filaments, a switch normally in the position to excite the bright filament but shiftable to deenergize the latter and excite the dim filament, automatic means controlling said switch, a light sensitive cell controlling said automatic means and positioned for energization by the headlight of an approaching vehicle, a supplemental light positioned adjacent said cell and energized in the dim position of said switch, and an auxiliary energizing light energized when the switch is in a dimmed position and so positioned to affect the cell of an approaching car on which the corresponding auxiliary energizing light jointly with the supplemental light maintains the activity of said cell, the cell and supplemental light being housed in a casing positioned below said headlight and the casing having a condensing means carried in the front wall thereof to concentrate the light rays from an approaching vehicle on said cell, and the auxiliary energizing light being carried by said casing and disposed below said condensing means, and a casing enclosing said energizing light and being provided with an oval lens closing the front thereof, the major axis of the oval being horizontally disposed.

LEONARD W. GILLESPIE.